United States Patent Office.

GEORGE C. WINCHESTER, OF ASHBURNHAM, MASSACHUSETTS, ASSIGNEE OF OSMORE A. BINGHAM.

*Letters Patent No.* 94,553, *dated September* 7, 1869; *reissue No.* 3,890, *dated March* 22, 1870.

IMPROVED CHAIR-SEAT.

The Schedule referred to in these Letters Patent and making part of the same.

*To all whom it may concern:*

Be it known that OSMORE A. BINGHAM, of Gardner, in the county of Worcester and State of Massachusetts, has invented a new and useful Improvement in the Application of a Seat or Cushion to the Back or Seat-Frame of a Chair; and I, GEORGE C. WINCHESTER, of Ashburnham, in said county and State, assignee of said BINGHAM, do hereby declare the same to be fully described in the following specification and represented in the accompanying drawings, of which—

Figure 1 denotes a top view, and

Figure 2, a transverse section of a chair-seat, with my improvement.

In the drawings—

A denotes the seat-frame, and

B, the web applied thereto.

The said seat-frame is formed with a groove, *e*, extending around it and arranged in it, near its inner edge, such groove being either square or rectangular in transverse section.

The web (which may be formed of two cloths, *a b*, composing the case of a cushion, and containing between them the stuffing *c*, of hair or other proper material) is lapped at its edge around a strip, C, of wood or other suitable material, having a section to correspond in form with that of the groove.

Next, the strip, with the edges of the web around it, is to be inserted and forced into the groove, the whole being so that, when the strip is in the groove, such strip shall be covered on all four sides by the web, the latter being preferably made to project from the strip in manner as shown in fig. 3, which exhibits, on an enlarged scale, the groove, the strip, and a piece of the webbing, and shows the method in which the latter is arranged with and around the strip, so as to cover it on its top surface.

In such fig. 3, A denotes the frame-bar;

*e*, the groove;

B, the web; and

C, the strip.

Figure 4 also exhibits the ordinary method of fixing a chair-seat or back to its frame by means of a groove and strip. In this latter figure it will be seen that the web or seat B is not arranged so as to cover the top surface of the strip C, such strip being usually held in place by nails, screws or cement, for unless so fastened, a slight pull, exerted horizontally on the web, will often serve to draw the strip and web out of the groove.

With my arrangement of the seating, viz: so as to cover the strip, not only will it be impossible to detach the strip from the groove by a horizontal strain on the webbing, exerted in the direction of the arrow *f*, but the strip will be covered, so as to be out of sight, by the webbing, and thus a better finish of the chair-seat will be made. Furthermore, no nails or screws will be required to keep the strip in place in the groove.

When the web is strained horizontally, while held by the strip in manner as shown in fig. 4, the tendency is to raise the strip out of the groove; but under the arrangement of the web and the strip in manner as shown in fig. 3, any tendency of a horizontal draft on the web to pull the strip out of the groove, will be counteracted or overcome by the web, which laps over the strip, as such will prevent the strip from being drawn out of the groove.

I make no claim to the web, and the strip so arranged in the groove that the top of the strip will be left uncovered by the web. Nor do I claim the arrangement of slits in a chair-bottom, and of strips of rattan on such strips, in manner as described and represented in the specification and drawings of the United States Patent No. 55,605, granted to Alanson Bingham.

With my invention I employ a groove, *e*, in the part or frame A, and a strip, C, to be pressed into such groove with the web.

I claim a chair-seat, in which the flexible seating or web is secured to the seat-frame by means of a groove and a web-retaining strip, the groove being made in the top of the seat-frame, and the web extending over and covering the strip.

GEO. C. WINCHESTER.

Witnesses:

J. B. CROSBY,

FRANCIS GOULD.